May 21, 1957 — W. L. GEIST ET AL — 2,793,127
DOUGH PACKAGE
Filed Nov. 26, 1954 — 3 Sheets-Sheet 2
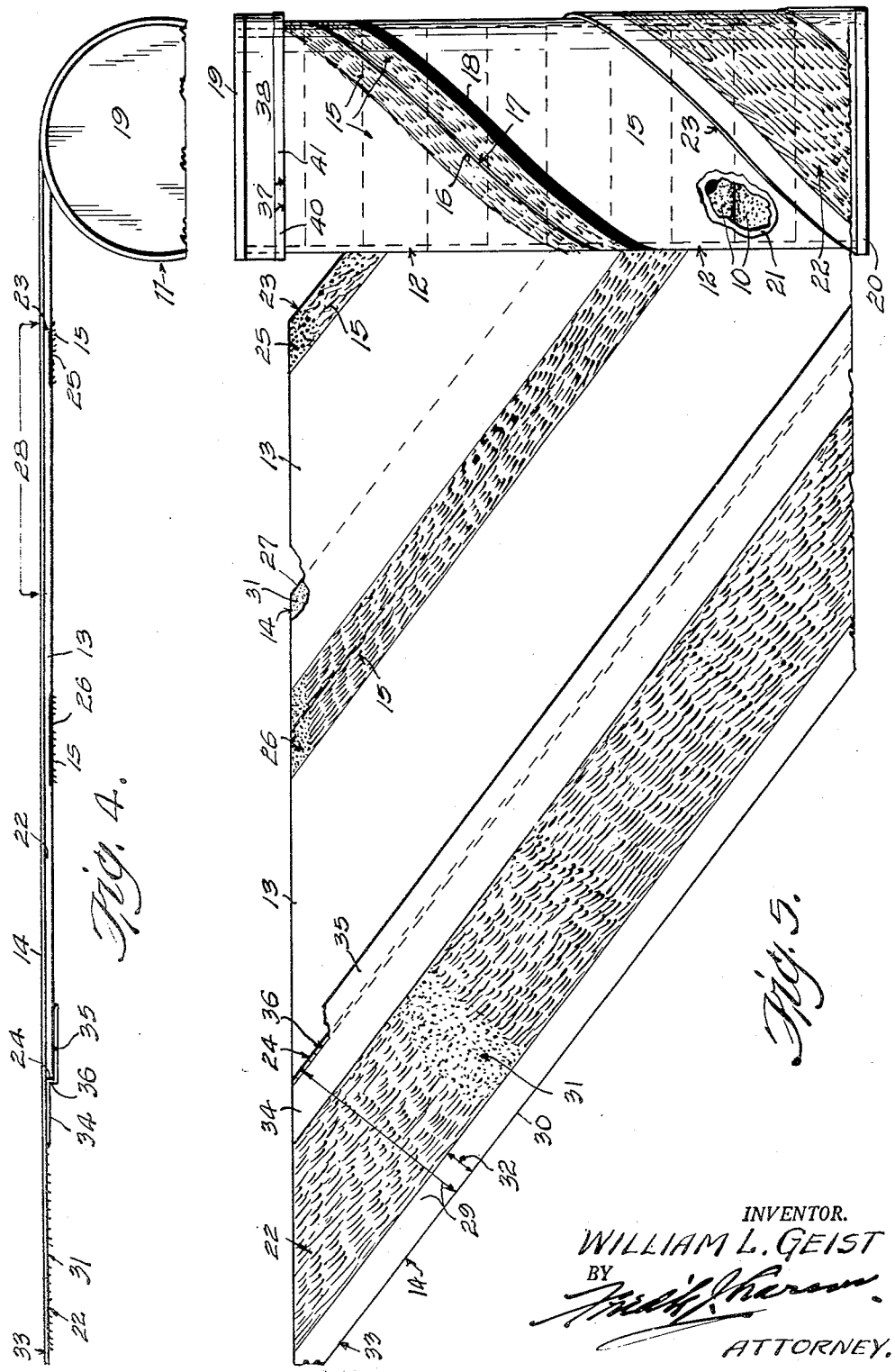
INVENTOR.
WILLIAM L. GEIST
ATTORNEY.

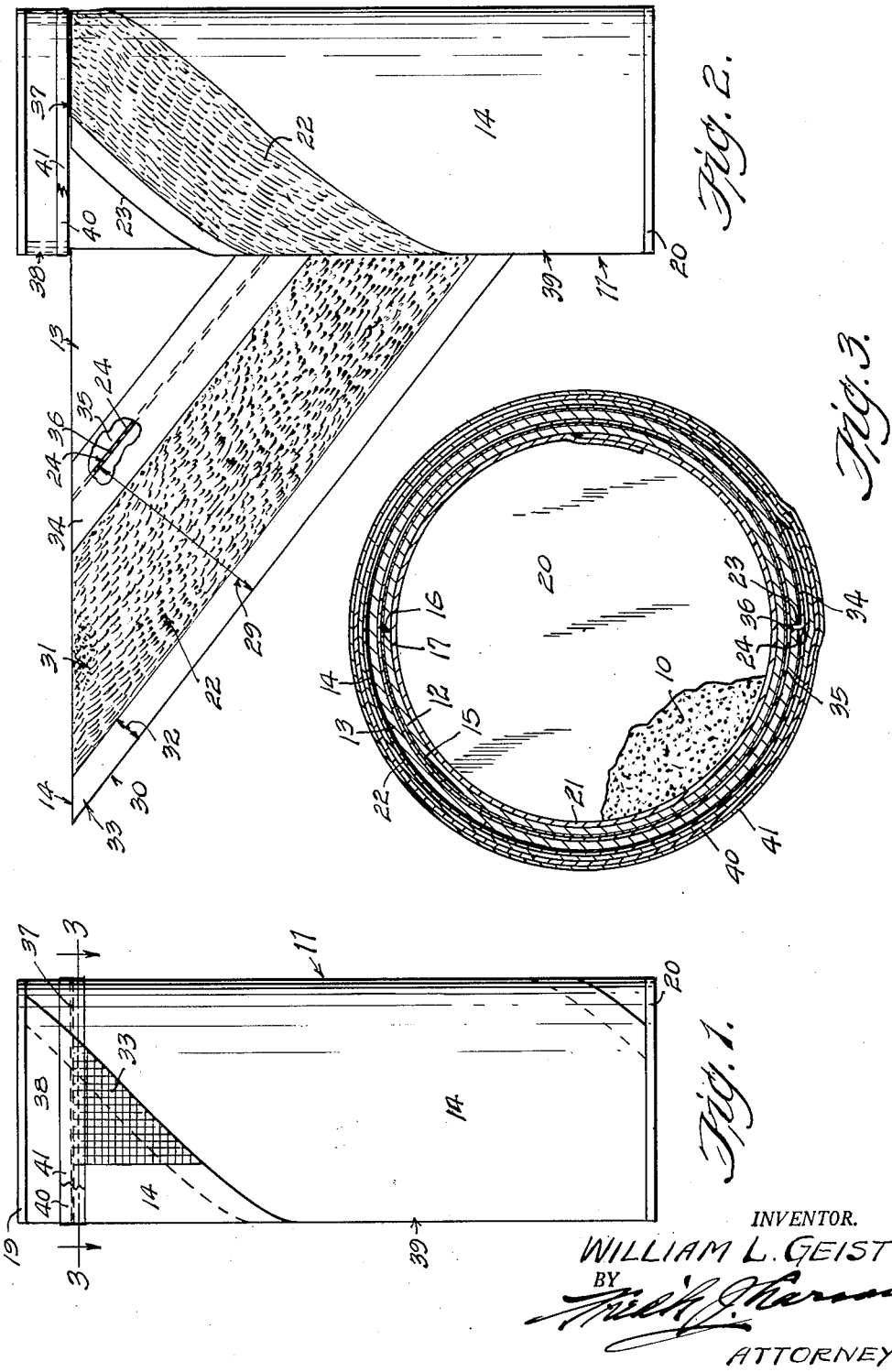

May 21, 1957 W. L. GEIST ET AL 2,793,127
DOUGH PACKAGE
Filed Nov. 26, 1954 3 Sheets-Sheet 3
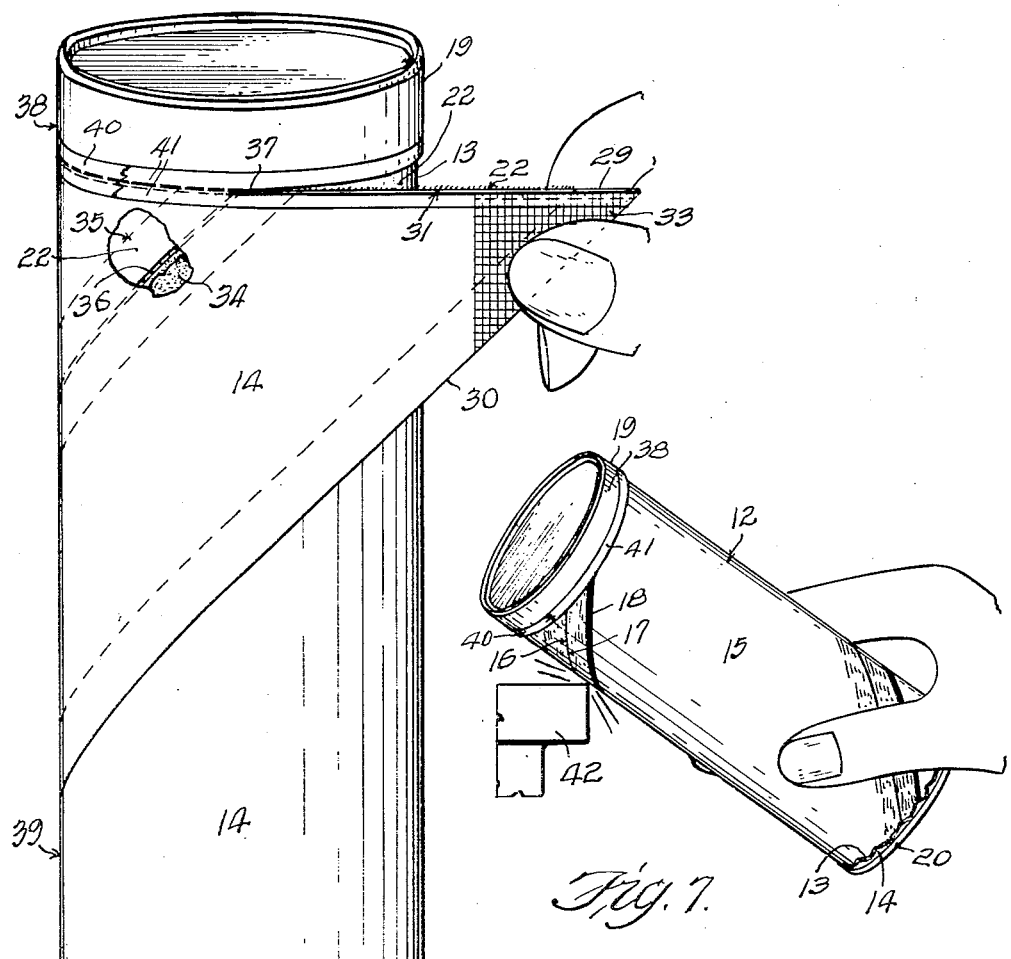
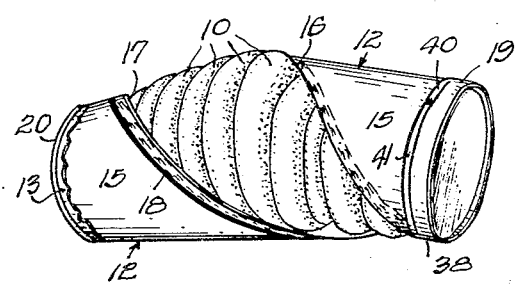
INVENTOR.
WILLIAM L. GEIST.
BY
ATTORNEY.

United States Patent Office 2,793,127
Patented May 21, 1957

2,793,127
DOUGH PACKAGE

William L. Geist and Wilbur G. Fienup, St. Louis, Mo., Hamilton W. Putnam, Jeffersonville, Ind., Ross A. Easter, Minneapolis, Minn., and Richard J. Zoeller, Louisville, Ky., assignors, by direct and mesne assignments, to R - C Can Company, St. Louis, Mo., a corporation of Missouri Application November 26, 1954, Serial No. 471,295

15 Claims. (Cl. 99—172)

I shall describe my instant invention in connection with a biscuit dough container and merchandising package, it being understood, however, that the utility of my invention is not necessarily confined by a consideration of the materials to be packaged, transported and distributed, and, it consists of a novel construction, arrangement and combination herein described and claimed.

The paper tubular container has of recent years, and, particularly, at the present time, become an important instrumentality in the packaging, transportation and distributing of food products, and, is now widely used for the distribution of biscuit dough paddies to be kept under refrigeration until used, and, my present invention has been found to have many points of superiority over the conventional type of helically wound paper container that must be cut with a knife to open the package to gain access to the biscuit dough paddies, or, the convolutely wound paper containers which are opened midway their length by a pull string. A helically wound paper container which has been used, but not too successfully in packaging, transporting and distributing biscuit dough paddies is disclosed in U. S. Patent No. 2,478,618.

The instant invention relates more particularly to a container for packaging biscuit dough paddies and having an improved type of means for facilitating access to the contents of the container, and, the removal of contents therefrom, without the use of a knife to cut the paper wall of the container.

In the manufacture of a container such as contemplated, it is an object of the invention that the helically wound label and a helically wound outer wrapping be circumferentially cut adjacent one end of the container, that one edge portion of the printed label which overlaps the other edge portion thereof is free of adhesive, and that one end of the overlapping edge portion of the label adjacent the circumferential cut is used as a holding or pull tab to grasp for peeling the label and the outer wrapping, as a unit, from the inner wrapping to expose the abutting side edges of the helically wound inner wrapping, and within which inner wrapping there is a foil liner which contains the biscuit dough paddies and closes the joint between the abutting edges of the inner wrapping.

A further object of the invention is to provide the outer face of the inner wrapping with a colored printed indicating line lying adjacent to and parallel with one of the abutting side edges of the inner wrapping so that a person opening the container may grasp the inner wrapping, after the outer wrapping has been removed therefrom and rap or strike the package at the colored line on the inner wrapping sharply against a table edge, or other object, to increase the pressure within the inner wrapping and promptly and completely open the inner wrapping by breaking the foil liner along the abutting edges of the inner wrapping to cause spreading or separating of the abutting edges, and to provide a helical opening along the length of the package to gain access to the biscuit dough paddies without first having to cut the outer wrapping, as is now the practice, as such knife cutting operation is always dangerous and has often resulted in injury to the person opening the package.

A further object of the invention is to adhesively secure one edge portion of the outer wrapping to the inner wrapping.

A further object of the invention is to provide the outer wrapping with a wider strip of glue inwardly of and spaced from the glue strip at one edge of the outer wrapping for adhesively securing that edge of the outer wrapping to the inner wrapping for securement of such glue strip of the outer wrapping to the abutting edge portions of the inner wrapping, and to seal the joint between the abutting side edges to prevent gas and moisture leakage from within the package as well as prevent air and moisture leakage into the inner wrapping.

Another object of the invention resides in the provision of a hard finish craft paper strip which, along one edge portion thereof, is secured to the inner face of the label with the remainder thereof overlapping an edge of the inner face of the outer wrapping and free of adhesive securement to the outer wrapping and the inner wrapping. This prevents any adhesive on the label from spreading to the nearly abutting side edges of the outer wrapping and permits ready removal or peeling of the outer wrapping from the inner wrapping upon exerting a pull upon a holding or pull tab which is an integral part of the label.

A still further object of the invention is to so treat the printed label with paraffin after the container has had one end closure applied thereto, and before the biscuit dough paddies have been placed within the container, to close all interstices of the circumferential cut of the label and the outer wrapping and to seal the cut to prevent air and moisture leakage into the container, and gas and moisture leakage outwardly of the container after the other end closure has been applied.

A still further and important object of the invention is the provision of a material for the inner and the outer wrappings of the body of the container that is made of newsline strawchip paper material so that glue applied on the straw chip facing of the outer wrapping when set, will pull off the major portion of the newsline facing of the inner wrapping to weaken the wall of the inner wrapping, and especially at the abutting edge portions thereof whenever the label and the outer wrapping is peeled, as a unit, from the inner wrapping.

Additional objects, advantages and features of the invention will be apparent from the following description considered in conjunction with the accompanying drawings, wherein—

Fig. 1 is a side view of a biscuit dough container and merchandising package embodying my invention.

Fig. 2 is a side view of the package illustrating the step in peeling the label and outer wrapping, as a unit, from the inner wrapping.

Fig. 3 is a cross-sectional view taken in line 3—3 of Fig. 1.

Fig. 4 is a top view of the package showing the further step of peeling the label and outer wrapper, as a unit from the inner wrapping, the outer wrapper being shown as nearly removed.

Fig. 5 is a side elevation of Fig. 4.

Fig. 6 is an enlarged side view of the package illustrating the initial step in peeling the outer wrapper from the inner wrapping.

Fig. 7 illustrates the package with the outer wrapping completely removed and showing the inner wrapping of the package being struck against an object to break the foil liner by internal pressure.

Fig. 8 illustrates the package helically opened after being struck against an object to gain access to the biscuit dough paddies.

The instant container is especially adapted for the packaging biscuit dough paddies designated 10, to be kept under refrigeration until the package is opened, and the packages must be strong enough to withstand internal gas pressure up to sixty pounds or more per square inch, and so constructed as to prevent biscuit dough gas and moisture leakage from within the package, as well as to prevent air and moisture leakage into the container of the package.

In the drawings the container is designated, generally, as 11, which as may be seen in Figures 1 and 2 is formed from helically wound fibrous wrappings 12 and 13, and a printed label 14. The wrapping 12 will be referred to as the inner wrapping and the wrapping 13 will be referred to as the outer wrapping for convenience of describing the construction of the container.

The inner wrapping 12 is preferably twenty-five point, or equivalent, newsline straw chip paper material, and the special newsline facing thereof is designated 15, and it is the outer facing of the inner wrapping. The wrapping 12 is of such shape as to be helically wound into a cylindrical form having the abutting side edges designated 16 and 17 which are normally free of any adhesive securement until the outer wrapping 13 is helically wound thereon. Adjacent to the abutting edge 17, the inner wrapping 12 is provided with a printed colored indicating line 18 extending parallel to the edge 17 and throughout the length thereof. The printed indicating line 18 thus extends from the top metal end closure 19 to bottom end closure 20 of the inner wrapping 12.

A suitable overlapping foil, or equivalent material 21 is suitably secured to the inner face of the inner wrapping 12 and it spans and closes all interstices of the inner wrapping.

The outer wrapping 13 of the container is preferably of sixteen point newsline chip paper material, or equivalent fibrous material, and the newsline facing 22 thereof, which is especially made for the purpose and it is the outer facing of the outer wrapping 13. The outer wrapping 13 is also so shaped as to be helically wound around the inner wrapping 12 with the newsline facing 22 thereof facing the label 14. The helically parallel edges 23 and 24 of the outer wrapping 13 are slightly spaced apart and out of register with the abutting side edges 16 and 17 of the inner wrapping 12. The inner or straw chip face of the outer wrapping 13 is provided along its edge portion 24 with a suitable strip of glue 25, as shown in Figure 5, of the drawing, which glue adheres to the newsline facing 15 of the inner wrapping 12 for securement of the edge portion 24 of the outer wrapping 13 to the inner wrapping 12.

The inner straw chip face of the outer wrapping 13 is also provided inwardly of the glue coating strip 25 with a suitable and wider strip of glue 26 to unite a strip of the outer wrapping to the inner wrapping along a helical path at the abutting edge portions of the inner wrapping and to unite the abutting edges 16 and 17. The glue strip 26 which unites the abutting edges 16 and 17 of the inner wrapping 12 also closes and seals the joint therebetween and secures the outer. wrapping 13 to the inner wrapping 12 along and adjacent to the abutting edge path of the printed indicating line 18.

The printed label 14 may be of any suitable material, and if desirable may be printed directly upon the outer wrapping 13. The label is helically wound upon the outer face of the outer wrapping 13 with one edge thereof designated 27 falling short of the adjacent edge 23 of the outer wrapping 13. This arrangement provides an outer facial space 28 on the outer wrapping 13 which is not occupied by a corresponding facial portion of the label, as is clearly shown in Figures 4 and 5 of the drawing. The other side edge portion 29 of the label 14 freely overlaps the edge 24 of the outer wrapping 13, as clearly shown in Figures 4 and 5 of the drawing. Inwardly of the edge 30 of the overlapping edge portion 29 of the label 14 and up to the glue 31 on the label 14 leaves an edge portion 32 on the label which may be free of any adhesive, or if glued, it must be kept dry, so as to be free to start the peeling off operation of the newsline facing 22 of the outer wrapping 13 beyond the side edge portion 32 of the label 14 by pulling on a holding or pull tab designated 33 at one end of the label, as clearly shown in Figures 2, 5, and 6.

A hard finish flexible craft paper strip 34 is adhesively secured along one edge portion thereof to the inner face of the label which face is provided with the glue 31, as shown in Figures 2 and 5 of the drawing. This strip 34 has a portion 35 thereof overlapping the inner face of the nearly abutting edge portion 24 of the outer wrapping 13 and it is free of glue and securement to either the inner, or the outer wrappings 12 and 13, respectively. The intermediate portion 36 of the craft paper strip 34 lies between the nearly abutting edges 23 and 24 of the outer wrapping 13, as shown in Figures 2 and 3 of the drawing, and it prevents any glue 31 on the inner face of the label 14 spreading to the nearly abutting edges 23 and 24 of the outer wrapping 13 as the outer wrapping is wound on the inner wrapping 12.

The printed label 14 and the outer wrapping 13 are each provided with a circumferential cut 37 adjacent the upper end of the container to sever the label 14 and the outer wrapping 13 into two separate sections designated as a short upper section 38 and, a longer lower section 39. The short upper section 38 of the label 14 and the outer wrapping 13 thereunder is not removeable from the container, as by peeling from the inner wrapping 12, as is the longer lower section 39 from the inner wrapping 12.

The printed label 14, at the circumferential cut 37 is treated with a suitable number of coats of hot paraffin, preferably two coats designated 40 and 41. This treatment of the label closes all interstices in the circumferential cut 37 of the label 14 and the outer wrapper 13, and it seals the cut 37 against air and moisture leakage into the container and gas and moisture leakage from within the container. The gas pressure within the package may build up to sixty-five pounds or more to the square inch, thus it will be seen that the container must be strong and sturdy enough to withstand such pressure when the package gets warm without opening at any seam or joint, and yet when the longer lower section 39 of the outer wrapping 13 is peeled with the newsline facing 15 of the inner wrapping 12, which is done by pulling on the holding or pull tab 33, it is just weak enough to easily spread and widen the helical joint between the abutting side edges 16 and 17 of the inner wrapping 12 by first splitting the foil liner 21. If the gas pressure within the container is not great enough to split the liner 21 and open the inner wrapping 12 by spreading the abutting edges 16 and 17, a sharp impact, rap or blow of the inner wrapping 12, at the colored indicating line, 18, adjacent the abutting edges on the edge of a table or against some other object 42 will instantly cause sufficient pressure to be built up within the package to split the foil liner 21 and to spirally open the inner wrapping 12, as shown in Figure 7 of the drawing to allow free access to the removal of the biscuit dough paddies 10 from the package.

It will be apparent from the foregoing description that I provide a biscuit dough paddie container comprising an inner wrapping 12 of helically wound newsline straw chip fibrous material with a newsline face to the outside with a colored indicating line thereon, and an outer wrapping 13 of helical wound newsline straw chip paper material with the straw chip face to the inside, an adhesive strip 25 on to the straw chip face of the outer wrapping 13 to span the abutting edge portions of the inner wrapping to seal the joint between the abutting edges 16 and 17 and secure the outer wrapping 13 to the inner wrapping 12 along the abutting edged portions thereof to open up and expose the joint between the abutting edges 16 and 17 of the inner wrapping 12 to weaken the inner wrapping 12 along the helically disposed abutting edge portions thereof so that gas pressure may fracture the foil liner 21 along the helical joint between the edges 16 and 17 and separate the butting edges to provide access to biscuits within the containers so as to remove the same therefrom.

The many advantages of the herein described invention will readily suggest themselves to those skilled in the art to which it appertains, due to the fact it is not necessary to cut the container body with a knife or to pull a string to open the container and because the biscuit dough paddies will not fly all over the room when the package is opened by merely pulling the holding tab 33 to peel the label 14 and the longer lower section 39 of the outer wrapping 13 from the inner wrapping 12.

While a preferred form of the container has been shown and described, this is by way of illustration only and I consider as my own all such modifications in construction as fairly fall within the scope of the appended claims.

What we claim is:

1. A dough package comprising a container with dough contained therein and constructed to permit said dough to be bodily removed therefrom without mutilation, said container comprising a lined inner fibrous paper body forming a generally cylindrical casing and having a generally helical separation line extending substantially the full length thereof and pitched to extend helically around substantially the complete circumference of the container, a removable outer reinforcing helically formed wrapping superposed about said inner body and detachably adhesively held to the outer surface of said inner body, said outer wrapping having a readily detachable helical peeling edge portion to facilitate removal of the outer wrapping and release the binding tension of the outer wrapping about the inner body to permit the internal pressure exerted by the dough to expand said inner body along said helical separation line, and a pair of end closures secured to the ends of the container to confine the contents therewithin, said dough being bodily removable from the container without mutilation and deformation thereof by grasping the container ends and twisting the same in opposite directions to unwrap the container from the dough throughout substantially the entire length of the package.

2. The structure set forth in claim 1 and said peeling edge portion consisting in a marginal edge portion of the outer wrapping which is free and unattached from the underlying portion of the container.

3. The structure set forth in claim 2 and said free and unattached marginal edge portion being lapped over in overlying relation to the underlying marginal edge portion of the outer wrapping.

4. A dough package comprising a container with dough contained therein and constructed to permit said dough to be bodily removed therefrom without mutilation, said container comprising a helically formed lined inner fibrous paper body providing a generally cylindrical casing and having the edges of said inner body abutted in edge to edge relation to form a generally helical separation line extending substantially the full length of the container and pitched to extend helically around substantially the complete circumference of the container, a removable outer reinforcing helically formed wrapping superposed about said inner body and detachably adhesively held to the outer surface of said inner body, said outer wrapping having a readily detachable helical peeling edge portion to facilitate removal of the outer wrapping and permit the internal pressure exerted by the dough to expand said inner body along said helical inner separation line to helically open the cylindrical wall of said container for substantially the full length thereof, and a pair of end closures secured to the ends of the container to confine the contents therewithin, said dough being bodily removable from the container without mutilation and deformation thereof by grasping the container ends and twisting the same in opposite directions to unwrap the container from the dough throughout substantially the entire length of the package.

5. The structure set forth in claim 4 and said removable outer wrapping being helically formed in superposed relation about said inner body.

6. A dough package comprising a container with dough contained therein and constructed to permit said dough to be bodily removed therefrom without mutilation, said container comprising a lined inner fibrous paper body forming a generally cylindrical casing and having a generally helical separation line extending substantially the full length thereof and pitched to extend helically around substantially the complete circumference of the container, a two ply removable outer reinforcing helically formed wrapping superposed about said inner body and detachably adhesively held to the outer surface of said inner body, the two plies of said outer wrapping being securely interconnected with the outer ply being thinner than the inner ply and providing an attachment helical flap offset from the inner ply and overlying the opposite marginal edge portion of the inner ply to facilitate unwrapping of the flap from the inner ply and release the binding tension of the outer wrapping about the inner body to permit the internal pressure exerted by the dough to expand said inner body along said helical separation line, and a pair of end closures secured to the ends of the container to confine the contents therewithin, whereby said separation line may be expanded by grasping the container ends and twisting the same in opposite directions to unwrap the container from the dough throughout substantially the entire length of the package and permit said dough being bodily removable from the container without mutilation and deformation thereof.

7. A dough package comprising a container with dough contained therein and constructed to permit said dough to be bodily removed therefrom without mutilation, said container comprising a lined helically formed inner fibrous paper body with the edges thereof disposed in edge to edge abutment to provide a generally cylindrical casing with a helical joint forming a separation line extending substantially the full length of the container and pitched to extend helically around substantially the full circumference of the container, an outer reinforcing helically formed wrapping superposed about said inner body and having a separation line out of register with the separation line of said inner body and having detachable adhesive attachment with the outer surface of said inner body, a removable outer label wound about said outer reinforcing wrapping and adhesively attached thereto, said outer label being circumferentially offset with respect to said wrapping to provide an outer overlying flap detachably adhesively secured to the underlying portion of said outer wrapping with the outer marginal edge portion of said label defining a helical peeling edge to facilitate removal of said flap from said wrapping, said label and said wrapping being so constructed and arranged to facilitate bodily removal of the two elements together, and a pair of end closures secured to the ends of the container to confine the contents therewithin, said contents being bodily removable from the container without mutilation and deformation thereof.

8. The structure set forth in claim 7 and a pull-up strip securely adhered to the inner marginal portion of said label flap adjacent the edge of said inner wrapping and underlying said wrapping edge to provide a positive connection between said flap and said wrapping to insure integral removal of said two elements.

9. A dough package comprising a container with dough contained therein and constructed to permit said dough to be bodily removed therefrom without mutilation, said container comprising a lined helically formed inner fibrous paper body with the edges thereof disposed in edge to edge abutment to provide a generally cylindrical casing with a helical butt joint forming a separation line extending substantially the full length of the container and pitched to extend helically around the entire circumference of the container, an outer reinforcing helically formed wrapping assembly including a fibrous paper body wrapping and an outer label wrapping superposed about said paper body wrapping in circumferentially offset relation thereto and adhesively secured to the outer surface thereof, said outer label wrapping providing a removable flap portion detachably adhesively secured to the underlying portion of said body wrapping to facilitate helical peeling off of said flap and thereby permit rupture of said container along said separation line, and a pair of end closures securely clamped to the ends of the container to confine the contents therewithin, said dough being bodily removable from the container without mutilation and deformation thereof by grasping the container ends and twisting the same in opposite directions, to unwrap the container from the dough throughout substantially the entire length of the container.

10. A dough package comprising a dough container with dough contained therein and constructed to permit said dough to be bodily removed therefrom without mutilation, said container comprising a lined inner fibrous paper body forming a generally cylindrical casing and having a generally cylindrical separation line extending substantially the full length thereof and pitched to extend helically around substantially the complete circumference of the container, printed indicia substantially adjacent said separation line to clearly identify the same, a removable outer reinforcing helically formed wrapping superposed about said inner body and detachably adhesively held to the outer surface of said inner body, the area of said outer wrapping overlying said printed indicia being free from adhesive to preserve the printing thereon after removal of the outer wrapping, and a pair of end closures secured to the ends of the container to confine the contents therewithin, said dough being readily removable from the container without mutilation and deformation thereof by grasping the container ends and twisting the same in opposite directions to unwrap the container from the dough throughout substantially the entire length of the package.

11. A dough package comprising a container with dough contained therein and constructed to permit said dough to be bodily removed therefrom without mutilation, said container comprising a lined inner fibrous paper body forming a generally cylindrical casing and provided with a generally helical separation line, a removable outer reinforcing helically formed body superposed about said inner body, one of said bodies having a delaminating ply formed on the surface thereof adjacent the other body, said ply and the adjacent surface of the other body being adhesively interconnected, said delaminating ply being so constructed and arranged as to delaminate more readily than either of said body members to prevent tearing of said outer body and permit the same to be integrally peeled off and removed from the inner body, and a pair of end closures respectively closing the ends of the container.

12. The structure set forth in claim 11 and said delaminating ply being formed on the outer surface of the inner body.

13. The structure set forth in claim 12 and an adhesive coating interconnecting said inner body with the outer body in overlying relation to the helical separation line to provide positive interconnection between the marginal portions of the inner body adjacent thereto.

14. The structure set forth in claim 11 and said delaminating ply consisting in newsline short paper fiber material.

15. A dough package comprising a container with dough contained therein and constructed to permit said dough to be bodily removed therefrom without mutilation, said container comprising a lined inner fibrous paper body forming a generally cylindrical casing and provided with a generally helical separation line, an outer reinforcing helically formed wrapping superposed about said inner body, an outer label superposed about said outer body and adhesively secured thereto in circumferentially offset relation thereto to provide an overlying attachment flap adjacent the marginal edge portion of said label, said wrapping having a delaminating ply formed on the outer surface thereof underlying said flap, said ply being so constructed and arranged as to delaminate more readily than said wrapping or said label to permit peeling off of said label flap from the outer body without tearing of the label and permitting said container to be opened along said helical separation line, and a pair of end closures respectively closing the ends of the container.

References Cited in the file of this patent

UNITED STATES PATENTS

| | | |
|---|---|---|
| 1,936,417 | Ware | Nov. 21, 1933 |
| 1,988,091 | Schumacher | Jan. 15, 1935 |
| 2,051,923 | Vogt | Aug. 25, 1936 |
| 2,131,343 | Cordiano et al. | Sept. 27, 1938 |
| 2,314,338 | Graves et al. | Mar. 23, 1943 |
| 2,478,618 | Armstrong et al. | Aug. 9, 1949 |
| 2,681,284 | Graves | June 15, 1954 |